(12) United States Patent
Hiew et al.

(10) Patent No.: US 6,395,081 B1
(45) Date of Patent: May 28, 2002

(54) METHODS FOR PRODUCING TITANIUM DIOXIDE PIGMENTS HAVING IMPROVED GLOSS AT LOW TEMPERATURES

(75) Inventors: Michael Hiew, Columbia; Yarw-Nan Wang, Ellicott City, both of MD (US); Les Hamor, Clifton Park, WA (US); Brian Tear, Grimbsy; Robert McIntyre, Lincolnshire, both of (GB)

(73) Assignee: Millennium Inorganic Chemical, Inc., Hunt Valley, MD (US)

( * ) Notice: Subject to any disclaimer, the term of this patent is extended or adjusted under 35 U.S.C. 154(b) by 0 days.

(21) Appl. No.: 09/705,530

(22) Filed: Nov. 3, 2000

Related U.S. Application Data

(60) Provisional application No. 60/196,684, filed on Apr. 12, 2000.

(51) Int. Cl.[7] .................................................. C09C 1/36
(52) U.S. Cl. ........................ 106/446; 106/442; 106/445
(58) Field of Search ................................ 106/442, 445, 106/446

(56) References Cited

U.S. PATENT DOCUMENTS

| | | | | |
|---|---|---|---|---|
| 2,885,366 A | | 5/1959 | Her ............................ 106/446 |
| 3,437,502 A | * | 4/1969 | Werner ....................... 106/442 |
| 3,591,398 A | * | 7/1971 | Angerman ................... 106/442 |
| 3,876,442 A | * | 4/1975 | Thomas ....................... 106/446 |
| 3,897,261 A | * | 7/1975 | Allen .......................... 106/446 |
| 4,075,031 A | * | 2/1978 | Allen .......................... 106/446 |
| 4,125,412 A | | 11/1978 | West ........................... 106/446 |
| 5,041,162 A | * | 8/1991 | Brand ......................... 106/446 |
| 5,730,795 A | * | 3/1998 | Herkimer .................... 106/446 |
| 5,993,533 A | * | 11/1999 | Diebold et al. ............. 106/442 |

FOREIGN PATENT DOCUMENTS

| | | | |
|---|---|---|---|
| EP | 0073340 | | 9/1983 |
| EP | 412686 | * | 2/1991 |
| GB | 1207512 | * | 10/1970 |
| JP | 03-023221 | * | 6/1989 |

* cited by examiner

*Primary Examiner*—Anthony Green
(74) *Attorney, Agent, or Firm*—Kalow & Springut LLP; David A. Kalow; William D. Schmidt

(57) ABSTRACT

The present invention provides methods of preparing a titanium dioxide pigment having improved gloss properties which involves heating an aqueous slurry of base titanium dioxide pigment to a temperature below about 75° C., coating the base titanium dioxide pigment with a silica compound at a temperature below about 75° C. to form a silica coated titanium dioxide pigment; and coating the silica coated titanium dioxide pigment with an alumina compound at a temperature below about 75° C. to form the titanium dioxide pigment having improved gloss.

38 Claims, 1 Drawing Sheet

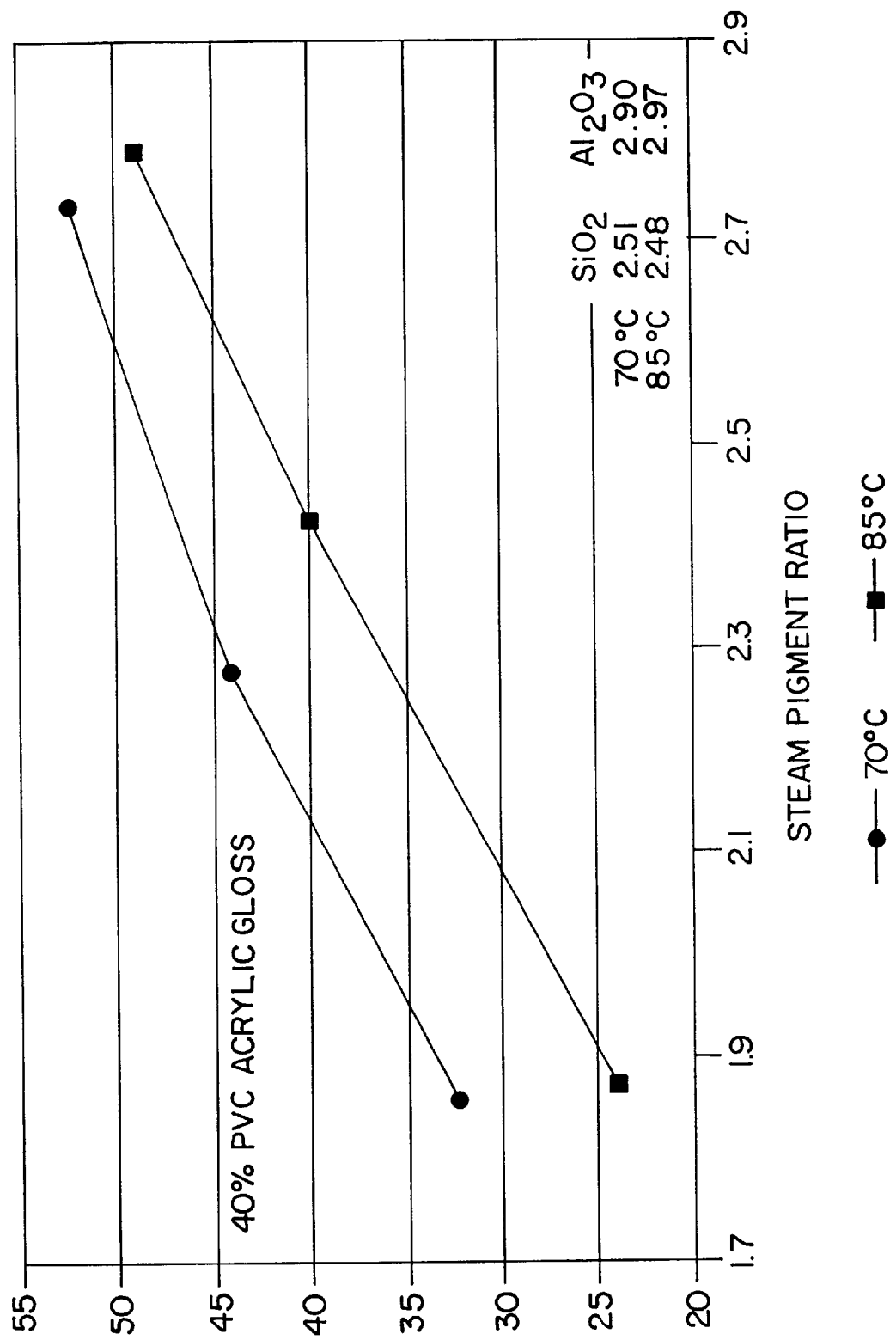

METHODS FOR PRODUCING TITANIUM DIOXIDE PIGMENTS HAVING IMPROVED GLOSS AT LOW TEMPERATURES

This application claims the benefit of the filing date of U.S. Provisional Application No. 60/196,684, filed Apr. 12, 2000 and entitled "Process for Producing Titanium Dioxide Pigments Possessing Improved Optical Properties Resulting from Low Temperature Processing", the entire disclosure of which is hereby incorporated by reference into the present disclosure.

FIELD OF THE INVENTION

This invention relates to methods for preparing titanium dioxide pigments at lower reaction temperatures than those of prior art methods. The titanium dioxide pigments of the present invention possess unexpected improvements in gloss when prepared at low temperatures.

BACKGROUND OF THE INVENTION

Titanium dioxide ($TiO_2$) pigments are important in the manufacture of paints, plastics, and coatings. There has been a considerable research effort to make titanium dioxide pigments to improve the gloss of paints, plastics, or coatings.

In general, pigments useful in the manufacture of plastics, paints and coating are comprised of a base titanium dioxide pigment having layers or coatings of various inorganic compounds. Such compounds include alumina, silica, zirconia, phosphates, and the like. Typically, coating titanium dioxide pigments with silica and alumina involves first preparing an aqueous slurry of titania particles, at a temperature of above 75° C. and subsequently adding a soluble silica compound to the slurry. The pH of the slurry is then adjusted to between about 8 and 10 to initiate the deposition of a dense silica layer. After silica deposition, an alumina compound is added to the slurry and deposited on the titania particles.

Many prior art references disclose that to prepare commercially acceptable coated titanium dioxide pigment, careful control of both the temperature above 75° C. and pH is required. Conventional prior art wisdom teaches that coating titanium dioxide at temperatures below 75° C. will produce a commercially unacceptable pigment with poor gloss and/or durability.

Many commercial treatment systems, i.e. single or multistage systems are designed to have maximum heating temperatures of 75° C. or less. Accordingly, prior art titanium dioxide pigments coated at temperatures above 75° C. can not be produced in such systems.

It would be beneficial to produce coated titanium dioxide pigments at lower reaction temperatures (e.g. below 75° C.) which utilize less overall heat energy while improving gloss and maintaining durability. Such pigments can be prepared in reactors that are designed to run at temperatures lower than 75° C. as well as reactors that run at higher temperatures.

Based on the foregoing, there is a need in the art for methods of preparing titanium dioxide pigments with commercially acceptable gloss and durability at temperatures below about 75° C. It has been unexpectedly discovered that coated titanium dioxide pigments produced at temperatures below about 75° C. will have commercially acceptable or improved gloss, while maintaining durability.

SUMMARY OF THE INVENTION

The present invention provides a titanium dioxide pigment with improved gloss produced using less overall heat energy. Accordingly, the present invention provides a method of preparing a titanium dioxide pigment having improved gloss properties comprising the steps of: a) heating an aqueous slurry of base titanium dioxide pigment to a temperature below about 75° C.; b) coating the base titanium dioxide pigment with a silica compound at a temperature below about 75° C. to form a silica coated titanium dioxide pigment; and c) coating the silica coated titanium dioxide pigment with an alumina compound at a temperature below about 75° C. to form the titanium dioxide pigment having improved gloss and acceptable durability.

In an alternate embodiment, the present invention provides a method of enhancing gloss of a titanium dioxide pigment comprising the step of: treating the titanium dioxide pigment with a silica compound and an alumina compound at a temperature below about 75° C.

In yet another embodiment, the present invention provides a method of treating titanium dioxide by coating the titanium dioxide with a silica compound and an alumina compound to form treated titanium dioxide having enhanced gloss, the improvement comprising the step of: maintaining the temperature of the titanium dioxide during the method at a temperature below about 75° C.

In a preferred embodiment, the present invention provides a method for preparing titanium dioxide pigment having improved gloss at reduced temperatures, comprising the steps of: a) heating a slurry of titanium dioxide pigment under agitation to a temperature between about 60° C. to below about 75° C.; b) adding a silica compound to the slurry; c) curing the silica to form a silica coated titanium dioxide pigment; d) adjusting the pH of the slurry to a value of from about 6 to about 7; e) adding an alumina compound to the silica-treated slurry while maintaining the pH at a value of about 6.5; f) curing the alumina compound under agitation to form an alumina coating; g) adjusting the pH of the slurry to a value of from about 5.5 to about 6.5; h) discharging, washing and filtering the pigment; and i) drying, micronizing and treating the pigment with trimethylolpropane.

For a better understanding of the present invention together with other and further advantages and embodiments, reference is made to the following description taken in conjunction with the examples, the scope of which is set forth in the appended claims.

BRIEF DESCRIPTION OF THE FIGURE

Preferred embodiments of the invention have been chosen for purposes of illustration and description, but are not intended in any way to restrict the scope of the invention. The preferred embodiments of certain aspects of the invention are shown in the accompanying figure, wherein:

FIG. 1 is a comparative graphic illustration of the effects of temperature on gloss (40% PVC Acrylic gloss) of titanium dioxide pigments coated with $SiO_2$ and $Al_2O_3$. The pigments produced at temperatures of 70° C. have improved gloss over pigments produced at 85° C.

DETAILED DESCRIPTION OF THE INVENTION

The invention will now be described in connection with preferred embodiments. These embodiments are presented to aid in an understanding of the present invention and are not intended to, and should not be construed to, limit the invention in any way. All alternatives, modifications and equivalents which may becomes obvious to those of ordinary skill on reading the disclosure are included within the spirit and scope of the present invention.

This disclosure is not a primer on the manufacture of titanium dioxide pigments, basic concepts known to those skilled in the art have not been set forth in detail.

Titanium Dioxide Base Pigments

Titanium dioxide pigment bases are produced commercially in two crystalline polymorphic forms, namely the rutile form which can be produced by both the chloride and sulfate processes and the anatase form which is normally produced by the sulfate process. Both of these well known processes are generally described in U.S. Pat. No. RE 27,818, and those basic descriptions are incorporated herein by reference.

Preferably, the base pigment useful in the present invention possess a substantially rutile crystalline structure. Such a base made, for example, by the chloride process will have a particle size range on the order of from about 0.1 to about 0.5 microns. Typically, bases made via the chloride process contain small amounts of aluminum oxides which are formed in the chloride process from aluminum chloride. The aluminum compound may be present in the $TiO_2$ pigment base in an amount of from about 0. to about 1.5 percent based on the titanium compound as is typically known in the art.

Generally, the $TiO_2$ base pigments useful in the process of this invention will have been wet milled and optionally hydroclassified prior to treatment in accordance with the process of this invention thereby providing a pigment substrate of substantially uniform particle size.

The process of the present invention comprises the formation of an initial aqueous slurry of the base titanium oxide pigment. Slurries of titanium dioxide pigment can be made by methods known in the art. Preferably the slurry has a $TiO_2$ solids content of less than about 40%, preferably less than about 35%, and more preferably less than about 30% by weight of the slurry.

Typically, the pH of the initial slurry can be determined by those skilled in the art and adjusted to a desired pH range used by methods known in the art. For example, if adjustment of the pH of the slurry becomes necessary, such adjustments can be made by simply adding a suitable acid or suitable base. Suitable bases include water soluble alkaline bases such as ammonia, sodium hydroxide or other suitable alkaline compounds. Suitable acids include water soluble acids such as hydrochloric acid, sulfuric acid, phosphoric acid, nitric acid, and the like. Preferably, the pH of the initial slurry (prior to addition of the silica compound) is at least about 7.0.

The slurry is heated to a temperature of below about 75° C. and maintained at this temperature throughout the process. Preferably, the slurry temperature is maintained at a temperature between about 60° C. to below about 75° C., more preferably between about 65° C. to about 70° C., and most preferably between about 65° C. to below about 75° C. The temperature of the slurry can be maintained throughout the process through the use of conventional heating means known by those skilled in the art, such as for example, by steam.

Silica Compounds

Following the formation of the initial slurry, a silica compound is added to the slurry while the slurry is maintained at a temperature of below about 75° C. For purposes of the present invention, any water soluble silica compound capable of providing silica for deposition upon the titanium dioxide pigment under the operating conditions of the process can be employed. Silica compounds suitable for use in the present invention include, but are not limited to, water soluble alkali metal silicates. Preferred water soluble alkali metal silicates include sodium silicate, potassium silicate, and the like. Most preferably, the silica compound is sodium silicate.

The weight percent of the silica compound in the slurry can vary depending on the thickness or concentration of the coating desired. Preferably, the silica coating is dense, amorphous and continuous rather than porous and discontinuous. As used herein, curing refers to maintaining the slurry under conditions so that silica compounds will deposit on the titanium dioxide base pigments. Preferably, the silica compound is added to the slurry in an amount such that the final pigment content comprises from about 0.5% to about 5.0% by weight of silica based on the total weight of the titanium dioxide pigment. More preferably, from about 1% to about 3% and most preferably, the silica content is about 2.5% based on the weight of the titanium dioxide pigment.

The silica compound can be added to the slurry under agitation, such as for example by an in-line mixer or other suitable means, over a period of preferably from about 15 minutes to about 120 minutes. The present invention is suitable for continuous or batch processes. In continuous processes, the residence times are preferably less than about 120 minutes, in contrast to batch processes where the treatment times are typically longer than 120 minutes. However, the skilled artisan is guided by the knowledge in the field and the present invention includes without limitation titanium dioxide pigments with improved gloss produced by the continuous process or batch process and combinations thereof.

The pH of the slurry is adjusted after the addition of the silica compound in order to produce a dense, amorphous coating on the titanium dioxide pigment. The specific pH can be determined by those skilled in the art and adjusted to a desired pH range used by methods known in the art. For example, if adjustment of the pH of the slurry becomes necessary, such adjustments can be made by adding a suitable acid or suitable base as discussed above. Most preferably, the pH is adjusted to the range of from about 6.0 to about 7.0 over a period of from about 15 to about 60 minutes after the silica compound is added.

Alumina Compounds

Following the deposition of silica on the titanium dioxide pigment of the present invention, an alumina compound is added to the slurry while the slurry is maintained at a temperature of below about 75° C. As used herein, alumina compounds include hydrous alumina compounds such as for example, water soluble alkali metal aluminate. Some water soluble alkali metal aluminates, include but are not limited to sodium aluminate or potassium aluminate. Some other alumina compounds include aluminum sulfate, aluminum chloride, and the like. Most preferably, the water soluble alumina compound is sodium aluminate.

The weight percent of the alumina compound can vary. Preferably, the alumina compound is added to the slurry in an amount to provide from about 1.5% to about 5.0% by weight and more preferably from about 2.0% to about 3.0% by weight, and most preferably about 2.0%, by weight of the alumina compound based upon the total weight of the titanium dioxide pigment.

Preferably, the alumina compound is added to the slurry under agitation, such as for example by an in-line mixer or other suitable means, over a period of preferably from about 5 minutes to 120 minutes, more preferably from about 10 minutes to 60 minutes, and most preferably, the alumina compound is added over about 10 minutes to 20 minutes.

The pH of the slurry is adjusted simultaneously in order to deposit the alumina compound on the silica coated titanium dioxide pigment. The specific pH can be determined by those skilled in the art and adjusted to a desired pH range used by methods known in the art. For example, if adjustment of the pH of the slurry becomes necessary, such adjustments can be made by simply adding a suitable acid or suitable base as discussed above. Most preferably, the pH is adjusted to the range of from about 6.0 to about 7.0 over a period of about 20 minutes.

The temperature of the slurry during the deposition of the alumina compound can be maintained below about 75° C. Preferably, the slurry temperature is maintained at a temperature between about 60° C. and below about 75° C., more preferably between about 65° C. to about 70° C., and most preferably between about 65° C. to below about 75° C. In one embodiment of the present invention, the alumina is deposited on the silica coated titanium dioxide pigment at a temperature as low as 65° C.

Upon completion of the addition of the alumina compound, the pH of the slurry is adjusted to preferably about 6.0 to 6.5, and most preferably to about 6.3. The resultant silica and alumina coated titanium dioxide pigment is recovered by filtration, washed substantially free of soluble salts adhering to the pigment, dried and then subjected to final comminution using fluid energy milling techniques known in the art. Preferably, the washed and dried pigment is micronized in a steam micronizer at intensities known by those skilled in the art to produce the desired particle size distribution.

Optionally, an organic compound, such as for example, trimethylolpropane (TMP) or pentaerythritol can be added to the pigment during air or steam micronization. In the most preferred embodiment TMP is added in an amount of from about 0.2% to 0.4% based on the weight of the titanium dioxide pigment.

Gloss

It has unexpectedly been discovered that the pigments produced by the methods of the present invention at temperatures below about 75° C. have improved gloss when compared to pigments made at higher temperatures.

Gloss is determined by methods known in the art. Preferably, the gloss is determined by incorporating the pigment into paint and measuring the gloss using a gloss meter. In the most preferred embodiment, the pigments made by the methods of the present invention are incorporated into acrylic based paints at 40% PVC (pigment volume concentration) and the 20° gloss measured. In the most preferred embodiment, the measured 40% PVC gloss value is from about 10 to about 20, for air micronized pigment and for steam micronized pigment, the values are from about 20 to about 60.

Generally, steam micronization involves temperatures of about 260° C. and pressures of from about 150 to 160 psi to obtain pigments of the desired particle size. Preferred steam to pigment ratios that improve gloss can be determined by those skilled in the art and include ratios from about 1.7 to about 3.0.

As used herein, improved gloss includes an increase in gloss when compared to pigments produced at higher temperatures above 75° C. Increased gloss includes increases preferably from about 1% to about 100%, more preferably, from about 10% to about 90%, and most preferably, from about 20% to about 60% over pigments prepared at higher temperatures above 75° C. Commercially acceptable gloss includes gloss ratings equivalent to that of pigments prepared at temperatures above 75° C.

CONTINUOUS AND BATCH PROCESSES

It will be understood by those skilled in the art that the methods of the present invention can be performed by a batch process or continuous process and combinations thereof. Continuous processes preferably involve continuous feed pipelines with cascading treatment tanks with separate addition points for silica and alumina compounds, pH adjusters and other additives. Continuous processes involve residence times of less than about 120 minutes, preferably from about 5 minutes to about 120 minutes, and more preferably from about 10 minutes to about 30 minutes for silica and alumina deposition on the titanium dioxide pigment. Accordingly, the resultant slurry is continuously coated, filtered, washed and dried.

Batch processes can generally involve longer pigment processing times. Batch processes can involve residence times in each step of treatment of generally greater than about 120 minutes for inorganic hydrous oxide deposition (i.e. silica and alumina) on the titanium dioxide pigment.

The methods of the present invention are also suitable for combination of batch and continuous processes. However, regardless of the process used, the pigments of the present invention are suitable for use in paints, plastics, and coatings, where high gloss is needed. Further, the pigments of the present invention also maintain durability comparable to other commercially available pigments.

Having now generally described the invention, the same may be more readily understood through the following reference to the following examples, which are provided by way of illustration and are not intended to limit the present invention unless specified.

EXAMPLES

The examples below demonstrate that titanium dioxide pigments produced at temperatures below about 75° C. have commercially acceptable or improved gloss. The following series of examples were prepared by batch process. The same conditions are applicable to a continuous process.

Example 1

In order to illustrate the importance of temperature the following pigments were prepared using identical conditions (same reagents, residence times, addition times, concentrations and pH values) and finishing condition with the exception of treatment temperatures. The pigments were prepared at 65° C., the second sample at 75° C. and the final sample at 85° C. according to Table I. Each pigment was prepared as follows: 1000 g of $TiO_2$ pigment was used for each surface coating experiment at a concentration sufficient to give a specific gravity of about 1.3 (approximately 31% $TiO_2$ solids content). Slurries were heated, under agitation, to 65° C., 75° C. or 85° C. and maintained at this temperature throughout the process (as shown in Table I). Next, 2.5% $SiO_2$ (based upon the weight of $TiO_2$) was then added as a solution of sodium silicate (168 g/l $SiO_2$) over a period of 20 minutes to the slurry. The slurry was agitated for an additional 5 minutes. The pH was then adjusted with HCl (225 g/l) to pH 6.5 over a period of either 20, 40 or 60 minutes. Subsequently, 2.0% $Al_2O_3$ (based upon the weight of $TiO_2$) was next added as a solution of sodium aluminate (226.9 g/l $Al_2O_3$) over a period of 20 minutes while maintaining the pH at 6.5 with simultaneous additions of HCL. The slurry was agitated for an additional 10 minutes. The pH was adjusted to 6.3 with HCl and the product filtered and washed substantially free of salts. The pigments were split into two portions with one portion blended with 0.4% TMP based upon $TiO_2$ weight and the other not treated with TMP. Pigments were dried overnight at 110–120° C., crushed through a 20 mesh screen and air micronized at a feed rate of 20 g/minute at an injection/grind pressure of 130 psi. The pigments were then prepared into an acrylic based paint at a 40% PVC (pigment to volume ratio) and the 20° gloss measured.

Gloss Measurement

Each pigment was incorporated into a 40% PVC (pigment volume concentration) Acrylic paint using a Synocryl 9122X resin. The prepared coating was drawn down on glass panels using an automatic draw-down device incorporating a 100-micron doctor blade. The paint panel was allowed to dry in a dust free cabinet for a minimum of 5 hours before reading the 20° gloss values from a Glossgard II glossmeter. Table I illustrates the improvement in gloss of the pigments when the temperature during the whole precipitation process is reduced (85 ° C., 75° C., 65° C.). Such improvements in gloss was independent of the rate of addition of the HCL, and TMP treatment.

TABLE I

| HCl Addition Time (min) | Treatment Temperature ° C. | % Trimethylolpropane | 40% PVC Gloss (20') |
|---|---|---|---|
| 60 | 65 | None | 14 |
| 40 | 65 | None | 11 |
| 20 | 65 | None | 13 |
| 60 | 75 | None | 12 |
| 40 | 75 | None | 9 |
| 20 | 75 | None | 12 |
| 60 | 85 | None | 9 |
| 40 | 85 | None | 9 |
| 20 | 85 | None | 8 |
| 60 | 65 | 0.4% | 20 |
| 40 | 65 | 0.4% | 17 |
| 20 | 65 | 0.4% | 18 |
| 60 | 75 | 0.4% | 16 |
| 40 | 75 | 0.4% | 16 |
| 20 | 75 | 0.4% | 16 |
| 60 | 85 | 0.4% | 14 |
| 40 | 85 | 0.4% | 16 |
| 20 | 85 | 0.4% | 14 |

Example 2

In this example, a second series of experiments was independently performed at 70° C. and 85° C. FIG. 1 graphically illustrates the results of sample pigments prepared at 70° C. and 85° C. The sample prepared at 70° C. contained about 2.51% $SiO_2$ and 2.9% $Al_2O_3$ (based upon the weight of $TiO_2$ pigment). The sample prepared at 85° C. contained 2.48% $SiO_2$ and 2.97% $Al_2O_3$ (based upon the weight of $TiO_2$ pigment). The other reaction parameters, described in the previous example, were identical for each pigment tested with the exception that steam micronization was used instead of low intensity air micronization. Steam micronization was performed at a temperature of 260° C. and pressures of 150 to 160 psi to obtain pigments of the desired particle size. Steam to pigment ratios were about 1.7 to 3.0.

From FIG. 1 it is clear that the trend in gloss improvement increases as the sample preparation temperature is lowered. The gloss levels of the samples prepared at lower temperatures are seen to be approximately ten percent improved over the samples prepared at 85° C.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A method of preparing a titanium dioxide pigment having improved gloss comprising the steps of:
   a) heating an aqueous slurry of a base titanium dioxide pigment to a temperature below about 75° C.,
   b) coating the base titanium dioxide pigment with a silica compound at a temperature below about 75° C. to form a silica coated titanium dioxide pigment; and
   c) coating the silica coated titanium dioxide pigment with an alumina compound at a temperature below about 75° C. to form the titanium dioxide pigment having improved gloss.

2. A method according to claim 1, wherein the slurry is heated to a temperature below 74° C.

3. A method according to claim 1, wherein the slurry is heated to a temperature of from about 60° C. to about 74° C.

4. A method according to claim 1, wherein the slurry is heated to a temperature of about 70° C.

5. A method according to claim 1, wherein the slurry is heated to a temperature of about 65° C.

6. A method according to claim 1, wherein the silica compound is sodium silicate.

7. A method according to claim 1, wherein the alumina compound is sodium aluminate.

8. A method according to claim 1, wherein the base titanium dioxide pigment is anatase or rutile.

9. A method according to claim 1, wherein the titanium dioxide pigment having improved gloss is produced by a continuous process.

10. A method according to claim 1, wherein the titanium dioxide pigment having improved gloss is produced by a batch process.

11. A method according to claim 1, wherein the titanium dioxide pigment having improved gloss is air micronized and comprises a 40% PVC gloss value of from about 10 to about 20.

12. A method according to claim 1, wherein the titanium dioxide pigment having improved gloss is steam micronized and comprises a 40% PVC gloss value of from about 20 to about 60.

13. A method according to claim 1, wherein the base titanium dioxide pigment is coated with the silica compound at an initial pH value of about 6.0 to 7.0 and alumina at a pH value of about 5.0 to 7.0.

14. A method according to claim 1, wherein the method further comprises the steps of: d) filtering, washing and drying the titanium dioxide pigment; and e) micronizing and treating the titanium dioxide pigment with an organic compound.

15. A method according to claim 14, wherein the organic compound is a polyol.

16. A method according to claim 15, wherein the polyol is trimethylolpropane.

17. A method according to claim 16, wherein the trimethylolpropane is added in an amount of from about 0.2% to 0.4% based on the weight of the titanium dioxide pigment.

18. A method of improving gloss of a titanium dioxide pigment comprising the step of:

treating the titanium dioxide pigment with a silica compound and an alumina compound at a temperature below about 75° C. to form the titanium dioxide pigment having improved gloss.

19. A method according to claim 18, wherein the temperature is below 74° C.

20. A method according to claim 18, wherein the temperature is from about 60° C. to about 74° C.

21. A method according to claim 18, wherein the temperature is about 70° C.

22. A method according to claim 18, wherein the temperature is about 65° C.

23. A method according to claim 18, wherein the silica compound is sodium silicate.

24. A method according to claim 18, wherein the alumina compound is sodium aluminate.

25. A method according to claim 18, wherein the titanium dioxide pigment having improved gloss is produced by a continuous process.

26. A method according to claim 18, wherein the titanium dioxide pigment having improved gloss is produced by a batch process.

27. A method according to claim 18, wherein the titanium dioxide pigment having improved gloss comprises a 40% PVC gloss value from about 10 to about 20 for air micronization.

28. A method according to claim 18, wherein the titanium dioxide pigment having improved gloss comprises a 40% PVC gloss value from about 20 to about 60 for steam micronization.

29. In a method of treating titanium dioxide by coating the titanium dioxide with a silica compound and an alumina compound to form treated titanium dioxide having improved gloss, the improvement comprising the step of:

maintaining the temperature of the titanium dioxide during the method at a temperature below about 75° C.

30. A method according to claim 29, wherein the temperature is below 74° C.

31. A method according to claim 29, wherein the temperature is from about 60° C. to about 74° C.

32. A method according to claim 29, wherein the temperature is about 70° C.

33. A method according to claim 29, wherein the temperature is about 65° C.

34. A method for preparing titanium dioxide pigment having improved gloss at reduced temperatures, comprising the steps of:
  a) heating a slurry of titanium dioxide pigment under agitation to a temperature between about 60° C. to below about 75° C.;
  b) adding a silica compound to the slurry;
  c) curing the silica to form a silica-treated slurry;
  d) adjusting the pH of the silica-treated slurry to a value of from about 6 to about 7;
  e) adding an alumina compound to the silica-treated slurry while maintaining the pH at a value of about 6.5;
  f) curing the alumina compound under agitation to form an alumina and silica treated slurry;
  g) adjusting the pH of the alumina and silica treated slurry to a value of from about 5.5 to about 6.5;
  h) discharging, washing and filtering the alumina and silica treated slurry of titanium dioxide pigment; and
  i) drying, micronizing and treating the alumina and silica treated pigment with a polyol.

35. A method according to claim 34, wherein the polyol is trimethylolpropane.

36. A method of preparing a titanium dioxide pigment having improved gloss comprising the steps of:
  a) heating an aqueous slurry of a base titanium dioxide pigment to a temperature below about 75° C.,
  b) coating the base titanium dioxide pigment with a silica compound at a temperature below about 75° C. to form a silica coated titanium dioxide pigment; and
  c) coating the silica coated titanium dioxide pigment with an alumina compound at a temperature below about 75° C. to form the titanium dioxide pigment having improved gloss; and
  d) adding a polyol to the titanium dioxide pigment having improved gloss.

37. A method according to claim 36, wherein the polyol is trimethylolpropane.

38. A method according to claim 37, wherein the trimethylolpropane is added in an amount of from about 0.2% to 0.4% based on the weight of the titanium dioxide pigment.

* * * * *